United States Patent
Kim et al.

(10) Patent No.: US 7,684,379 B2
(45) Date of Patent: Mar. 23, 2010

(54) OFDMA SYSTEM AND METHOD FOR CONTROLLING FREQUENCY OFFSETS OF SUBSCRIBERS IN UPLINK COMMUNICATION

(75) Inventors: Dong-Kyu Kim, Seongnam-si (KR); Yong-Je Lim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 444 days.

(21) Appl. No.: 11/147,900

(22) Filed: Jun. 8, 2005

(65) Prior Publication Data

US 2006/0002359 A1    Jan. 5, 2006

(30) Foreign Application Priority Data

Jul. 2, 2004    (KR) .................... 10-2004-0051527

(51) Int. Cl.
*H04J 1/00*    (2006.01)
(52) U.S. Cl. .................. 370/343; 370/208; 370/209; 370/210
(58) Field of Classification Search ................ 370/204, 370/343, 208–210, 319
See application file for complete search history.

(56) References Cited

U.S. PATENT DOCUMENTS 6,711,120 B1    3/2004    Laroia et al.
7,088,782 B2 *  8/2006    Mody et al. .................. 375/260
7,372,893 B2 *  5/2008    Park et al. .................... 375/147
2003/0179776 A1 *  9/2003    Sumasu et al. .............. 370/491
2005/0085249 A1 *  4/2005    Goldstein et al. ........... 455/502

FOREIGN PATENT DOCUMENTS

| KR | 2001-070399 | 7/2001 |
| KR | 2003-014660 | 2/2003 |
| WO | WO 01/73968 | 10/2001 |

* cited by examiner

*Primary Examiner*—Nay A Maung
*Assistant Examiner*—Tuan H Nguyen
(74) *Attorney, Agent, or Firm*—F. Chau & Associates, LLC

(57) ABSTRACT

Provided are an orthogonal frequency division multiple assess (OFDMA) system and a method for controlling frequency offsets of subscribers in uplink communication. The OFDMA system solves a problem that the system performance is deteriorated in uplink communications because subscriber stations have different carrier frequency offsets. Each subscriber station compensates for a frequency offset thereof in response to a frequency offset control signal provided by a base station and then transmits an uplink frame to the base station. The base station compensates for an average frequency offset using the uplink frame, which has a small frequency offset shift because each subscriber station compensates for the frequency offset thereof previously, and thus the frequency offset of each subscriber station can be correctly compensated to prevent inter-carrier interference.

20 Claims, 9 Drawing Sheets

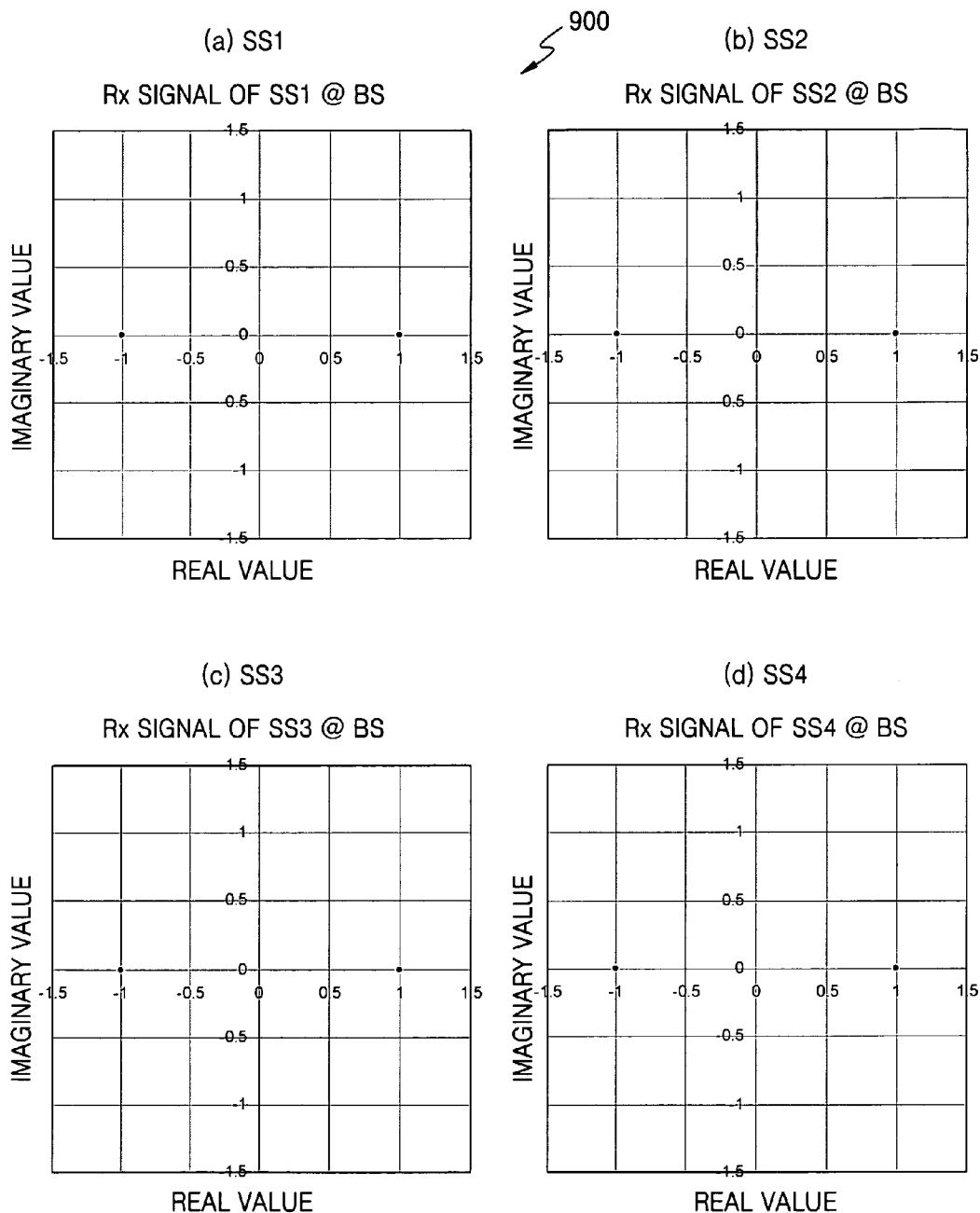

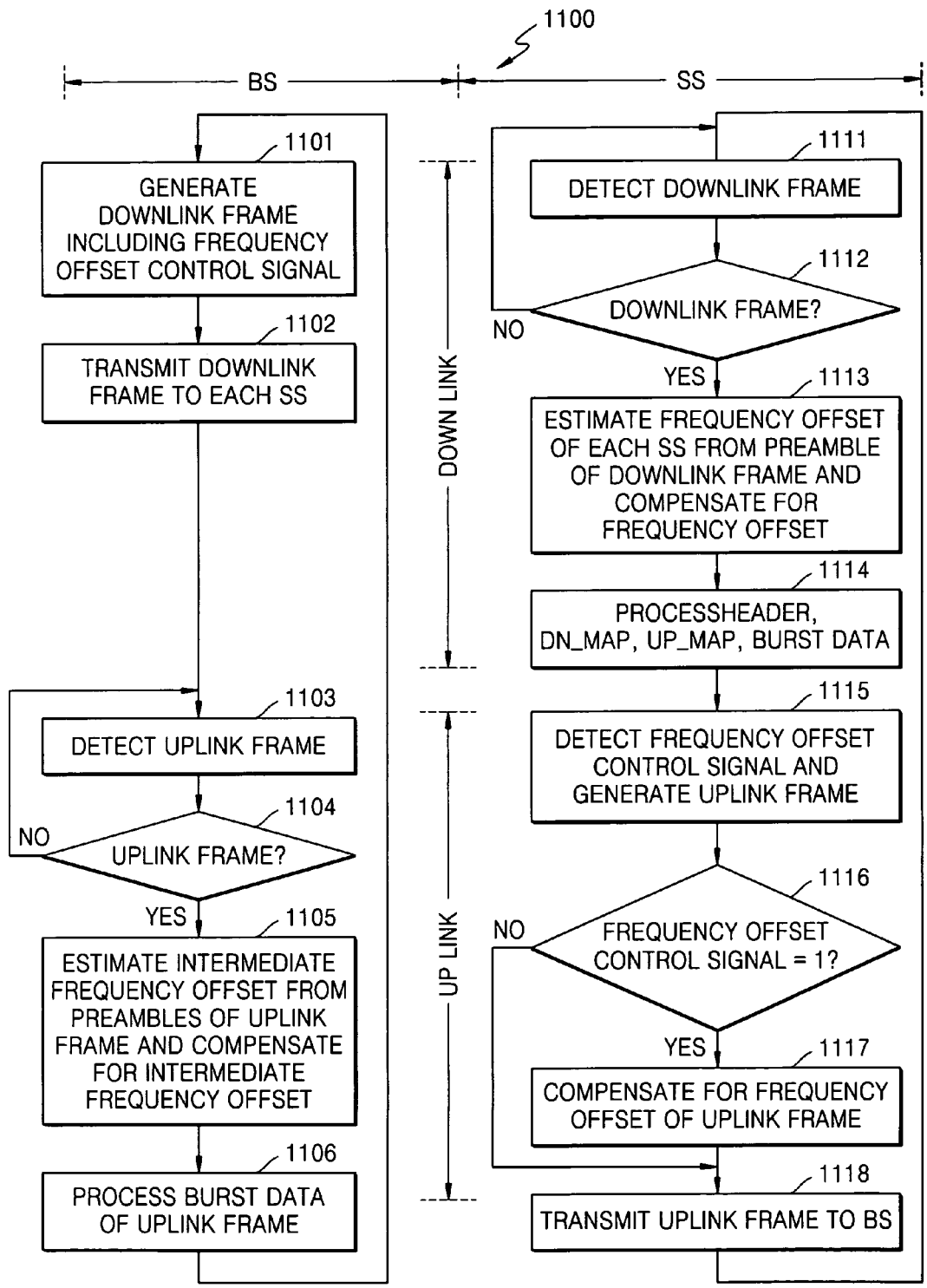

OFDMA SYSTEM AND METHOD FOR CONTROLLING FREQUENCY OFFSETS OF SUBSCRIBERS IN UPLINK COMMUNICATION

CROSS-REFERENCE TO RELATED APPLICATION

This application claims foreign priority under 35 U.S.C. §119 to Korean Patent Application No. 2004-51527, filed on Jul. 2, 2004, in the Korean Intellectual Property Office, the disclosure of which is incorporated herein in its entirety by reference.

BACKGROUND OF THE INVENTION

1. Field of the Invention

The present disclosure relates to digital communications and, more particularly, to controlling frequency offsets of subscribers in uplink communications.

2. Description of the Related Art

Orthogonal frequency division multiple access (OFDMA) has been considered as a new multiple access method in a wireless Metropolitan Area Network (MAN) such as IEEE 802.16a, and as a broadband mobile Internet access network such as flash-type OFDMA. The OFDMA method uses a larger number of subcarriers than a conventional Orthogonal Frequency Division Multiplexing (OFDM) system such as IEEE 802.11a, for example, and allocates a subchannel constructed of a set of a part of the subcarriers to each subscriber. The OFDMA method enables two-dimensional resource allocation in time and frequency domains. In addition, the OFDMA can reduce overhead due to a long guard space required for high-speed transmission because the OFDMA uses a large number of subcarriers. Moreover, the OFDMA can concentrate power on a part of the subcarriers so that efficient control and service area extension can be achieved.

FIG. 1 illustrates a multiple access communications environment of an OFDMA system, indicated generally by the reference numeral 100. Referring to FIG. 1, a single cell includes a single base station BS and a plurality of subscriber stations SS-1, SS-2 and SS-M corresponding to multiple access users. The subscriber stations transmit/receive communications data via the base station. The direction from the base station to the subscriber stations is called downlink and the direction from the subscriber stations to the base station is called uplink.

FIG. 2 illustrates a frame structure in the OFDMA environment, indicated generally by the reference numeral 200. The base station includes data items to be sent to the multiple subscriber stations in a single downlink frame, and transmits the downlink frame to the subscriber stations. Each subscriber station that has received the downlink frame reproduces only data allocated thereto and processes the reproduced data. When the downlink frame is finished, each subscriber station transmits an uplink frame to the base station. Each subscriber station transmits uplink data through a subchannel or subcarrier allocated thereto. The uplink frames transmitted from the subscriber stations are requested to simultaneously arrive at the base station.

Referring to FIG. 2, each of the downlink frames and uplink frames starts with a preamble. The preamble is used for a receiver to detect and reproduce a received signal. A header of the downlink frame includes frame construction information, and a downlink map DL-MAP stores information about which subscriber station receives a data part of the downlink frame. An uplink map UL-MAP of the downlink frame stores information about which subscriber station is allocated how many subchannels through the uplink frame following the downlink frame.

FIG. 3 illustrates a downlink communications environment, indicated generally by the reference numeral 300. Referring to FIG. 3, a baseband processor 310 of the base station modulates the downlink frame of FIG. 2 and loads the modulated downlink frame on a carrier frequency fc to transmit it to respective baseband processors 320, 330 and 340 of the subscriber stations. Respective receivers of the baseband processors 320, 330 and 340 of the subscriber stations receive and demodulate the modulated downlink frame. The baseband processors 320, 330 and 340 receive the downlink frame having phases shifted by frequency offsets $\Delta f_{o,1}$, $\Delta f_{o,2}$ and $\Delta f_{o,M}$ of their receivers, respectively. Accordingly, the respective receivers of the baseband processors 320, 330 and 340 estimate their frequency offsets through frequency offset estimators 321, 331 and 341 and subtract the estimated frequency offsets from the received downlink frame. Then, a frequency-offset-compensated downlink frame is respectively processed by modems 322, 332 and 342 of the subscriber stations.

FIG. 4 illustrates an uplink communications environment, indicated generally by the reference numeral 400. Referring to FIG. 4, respective transmitters of the baseband processors 320, 330 and 340 of the subscriber stations load data items, respectively processed by the baseband processors 320, 330 and 340, on the carrier frequency fc to construct an uplink frame and transmit the uplink frame to the baseband processor 310 of the base station. Here, the respective transmitters of the baseband processors 320, 330 and 340 of the subscriber stations transmit data items having phases shifted by frequency offsets $\Delta f_{o,1}$, $\Delta f_{o,2}$ and $\Delta f_{o,M}$ of the transmitters, respectively. The baseband processor 310 of the base station receives the uplink frame, obtains an average frequency offset $\Delta f_{o,BS}$ of the frequency offsets $\Delta f_{o,1}$, $\Delta f_{o,2}$ and $\Delta f_{o,M}$ of the transmitters using a frequency offset estimator 311, and subtracts the average frequency offset $\Delta f_{o,BS}$ from the received uplink frame such that the baseband processor 310 processes the average-frequency-offset-compensated uplink frame.

From constellations of signals transmitted from the baseband processors 320, 330 and 340 to the base station 310, it can be known that the average frequency offset compensation of the base station deteriorates communications performance.

FIG. 5 shows the results of reproduction of an uplink frame, indicated generally by the reference numeral 500, carried out by the base station, when the uplink frame is transmitted from four subscriber stations to the base station. Assume that the frequency offsets of first, second and third subscriber stations SS1, SS2 and SS3 are set to 0, the frequency offset of a fourth subscriber station SS4 is set to 0.05 times a subcarrier interval, and the uplink frame is transmitted as a binary phase shift keying (BPSK) signal. In addition, a single frame has a 15 OFDM symbol length.

Referring to FIG. 5, the base station estimated frequency offsets using preambles of the uplink frame. However, the base station estimated intermediate values of the frequency offsets so that signals transmitted from all subscriber stations were affected. Particularly, a value received from the fourth subscriber station SS4 has a large frequency offset so that the phase of the received value is rotated for each symbol, as shown in FIG. 5(d). That is, the frequency offset of each subscriber station is not correctly compensated to generate inter-carrier-interference. This deteriorates communications performance and decreases a maximum communications transmission rate.

Therefore, what is desired is an OFDMA system and a frequency offset compensating method capable of correctly compensating for the frequency offset of each subscriber station in uplink communications.

SUMMARY OF THE INVENTION

The present disclosure provides an OFDMA system capable of correctly compensating for the frequency offset of each subscriber station in uplink communication.

The present disclosure also provides a frequency offset compensating method in the OFDMA system.

According to an aspect of the present disclosure, there is provided an OFDMA system comprising a plurality of subscriber stations, which compensate for their frequency offsets on data to be transmitted to a base station to construct an uplink frame and transmit the uplink frame to the base station; and the base station compensating for the uplink frame by an intermediate frequency offset obtained by averaging frequency offsets of the uplink frame transmitted from the subscriber stations. The subscriber stations compensate for their frequency offsets on the uplink frame in response to a frequency offset control signal included in a downlink frame transmitted from the base station.

Preferably, each subscriber station compensates for the downlink frame transmitted from the base station by the frequency offset thereof, and compensates for the uplink frame by the frequency offset compensated on the downlink frame.

According to another aspect of the present disclosure, there is provided a frequency offset control method of an OFDMA system, comprising selectively compensating for frequency offsets of an uplink frame, respectively generated by a plurality of subscriber stations, in response to a frequency offset control signal provided by a base station; each subscriber station transmitting the uplink frame to the base station; the base station detecting the uplink frame; and estimating an intermediate frequency offset obtained by averaging frequency offsets from preambles of the uplink frame and compensating for the intermediate frequency offset.

According to another aspect of the present disclosure, there is provided a frequency offset control method of an OFDMA system, comprising a base station generating a downlink frame including a frequency offset control signal and transmitting the downlink frame to each subscriber station; each subscriber station detecting the downlink frame, estimating a frequency offset thereof and compensating for the frequency offset; each subscriber station detecting the frequency offset control signal and generating an uplink frame; each subscriber station compensating a frequency offset of the uplink frame in response to the frequency offset control signal; the base station detecting the uplink frame; and estimating an intermediate frequency offset obtained by averaging frequency offsets from preambles of the uplink frame to compensate for the intermediate frequency offset.

Accordingly, the OFDMA system of the present disclosure compensates for an average frequency offset using an uplink frame, which has a small frequency offset shift because each subscriber station compensates for the frequency offset thereof previously. Thus, the frequency offset of each subscriber station can be correctly compensated in uplink communications to prevent inter-carrier interference.

BRIEF DESCRIPTION OF THE DRAWINGS

The above and other features and advantages of the present disclosure will become more apparent by describing in detail exemplary embodiments thereof with reference to the attached drawings, in which:

FIG. 9 illustrates constellations of signals transmitted from subscriber stations to a base station in uplink communications using the OFDMA system of FIG. 6;

FIG. 11 is a flow chart showing a frequency offset compensating method using the OFDMA system of the present disclosure.

DETAILED DESCRIPTION OF PREFERRED EMBODIMENTS

Figure 1:
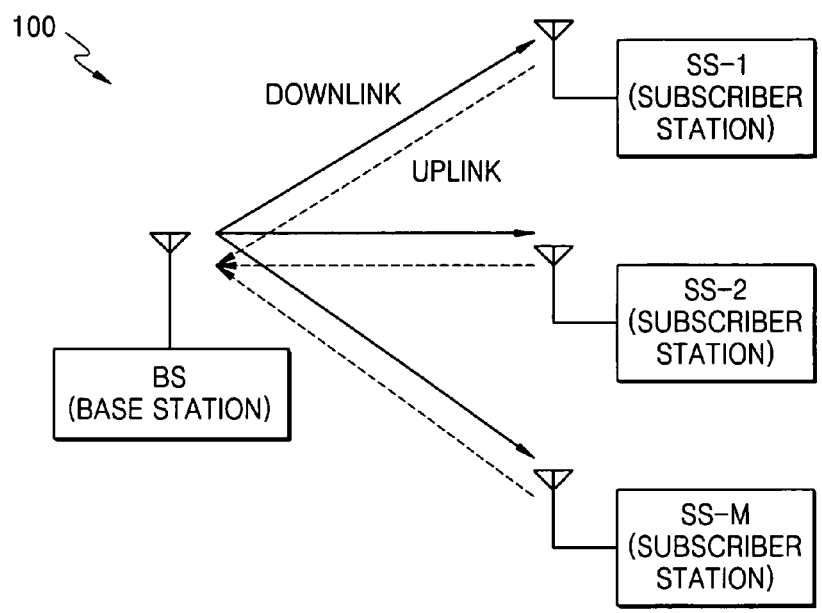
FIG. 1 illustrates a multiple access communications environment of an OFDMA system.
Figure 2:
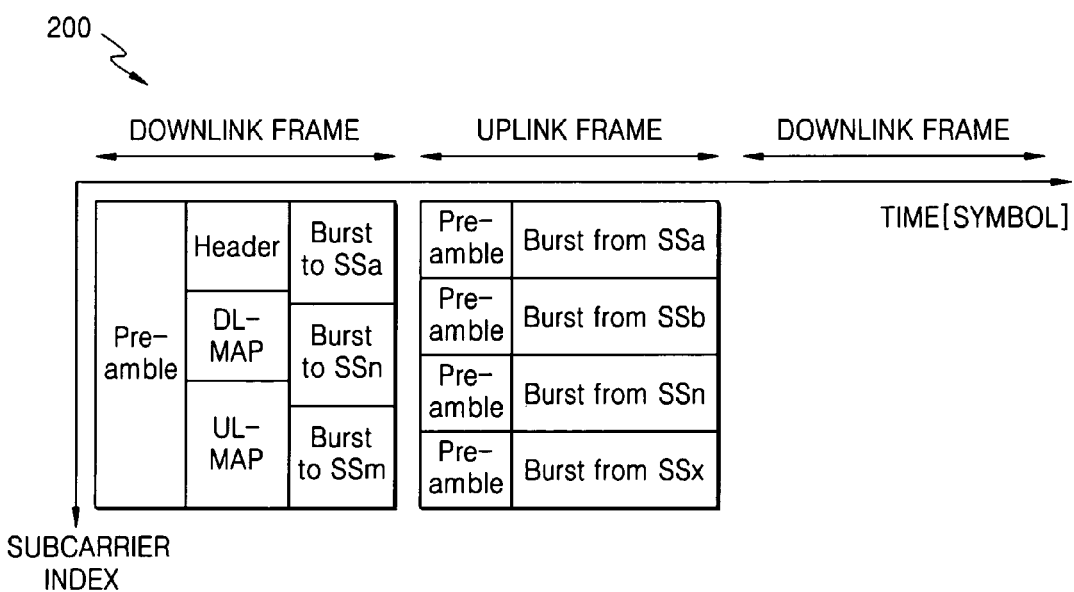
FIG. 2 illustrates a frame structure in an OFDMA environment.

The present disclosure will now be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. Throughout the drawings, like reference numerals refer to like elements.

Figure 3:
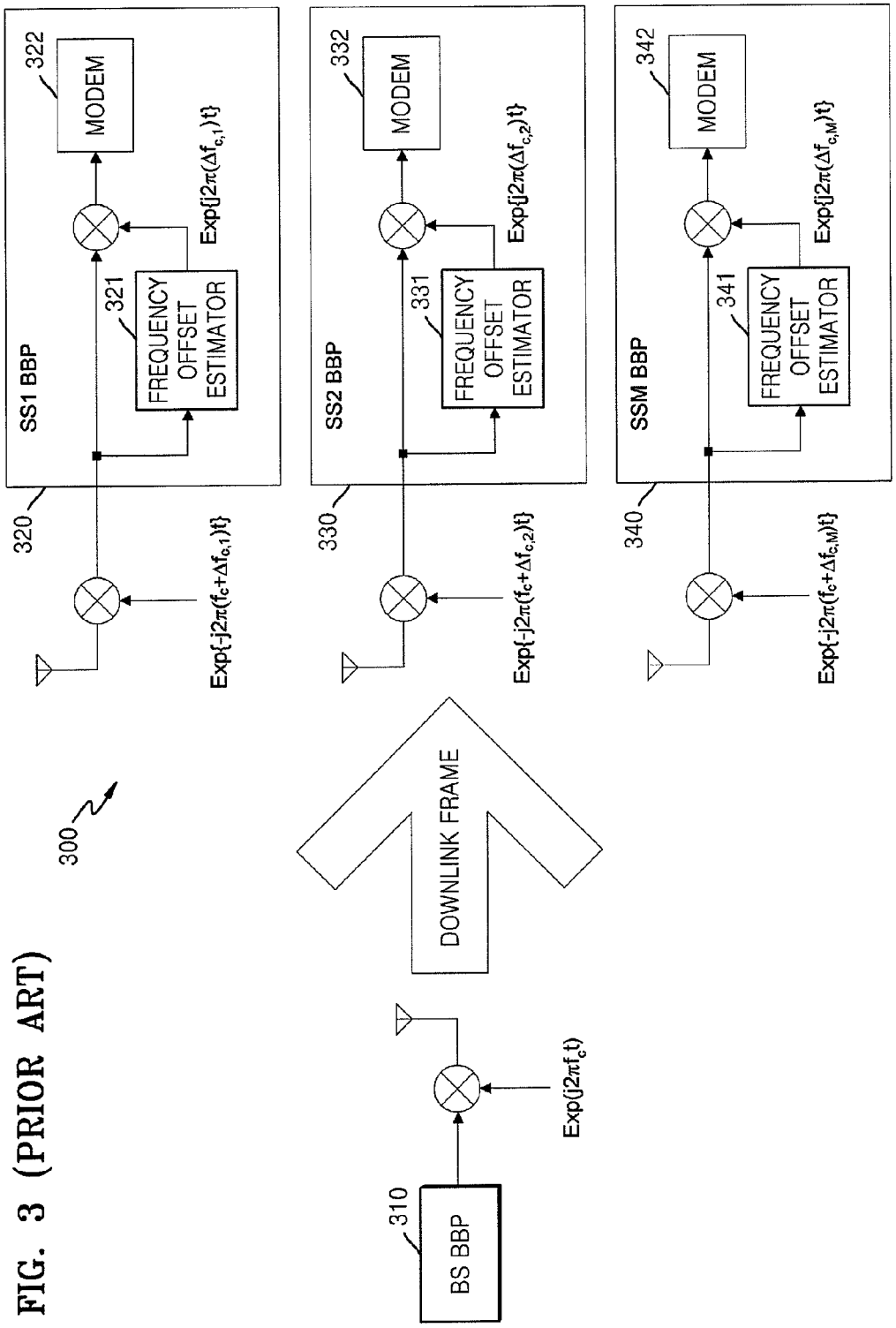
FIG. 3 illustrates an OFDMA downlink communications environment.
Figure 4:
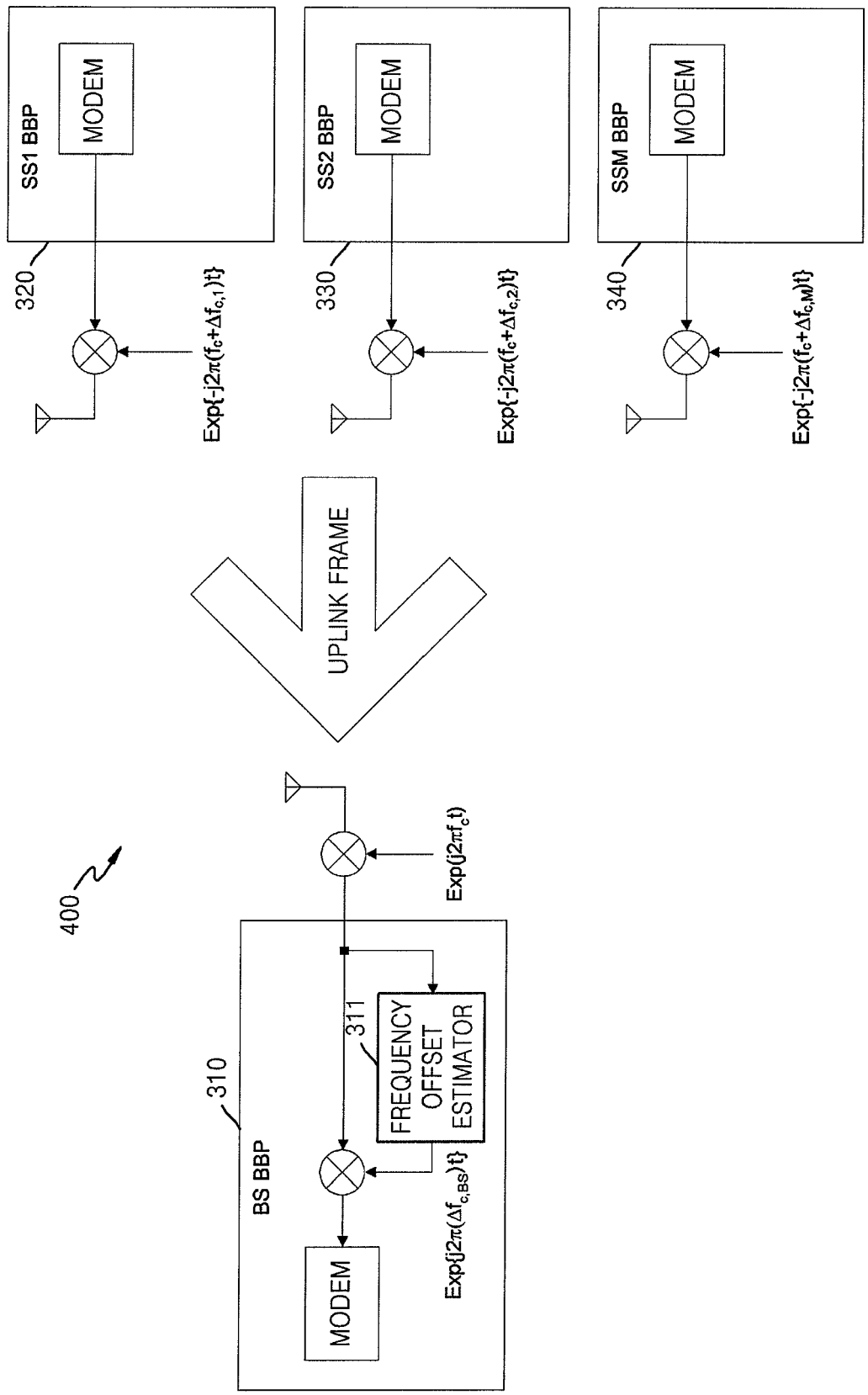
FIG. 4 illustrates an OFDMA uplink communications environment.
Figure 6:
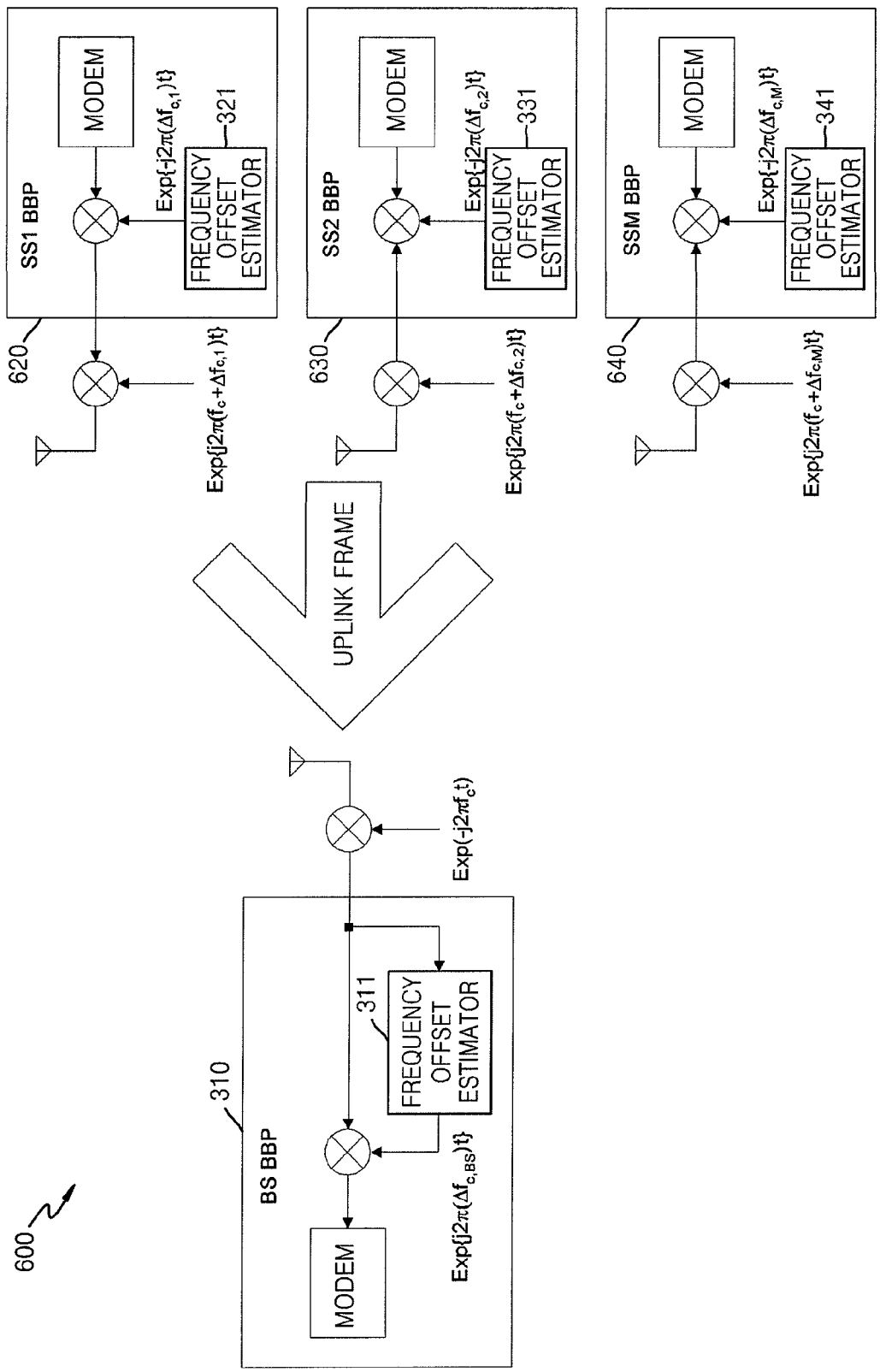
FIG. 6 illustrates an OFDMA system having a previous frequency offset compensating function in uplink communications according to an embodiment of the present disclosure.

FIG. 6 illustrates an OFDMA system 600 according to an embodiment of the present disclosure. Referring to FIG. 6, the OFDMA system 600 applies the method of estimating the frequency offset of each subscriber station from a preamble of a downlink frame and compensating for the frequency offset in downlink communication, described above with reference to FIG. 3, to uplink communication. Subscriber stations SS1, SS2 and SSM use their frequency offsets, which are respectively estimated by frequency offset estimators 321, 331 and 341 when respective receivers of the subscriber stations SS1, SS2 and SSM receive the downlink frame from a base station 310, for their transmitters 620, 630 and 640.

When the transmitters 620, 630 and 640 of the subscriber stations SS1, SS2 and SSM transmit data to the base station 310, the transmitters 620, 630 and 640 compensate for the frequency offsets $e^{-j2\pi(\Delta f_{o,1})t}$, $e^{-j2\pi(\Delta f_{o,2})t}$ and $e^{-j2\pi(\Delta f_{o,M})t}$, estimated by the frequency offset estimators 321, 331 and 341 of the receivers of the subscriber stations, and transmit the compensated frequency offsets, respectively. The base station 310 obtains an average value $e^{j2\pi(\Delta f_{o,BS})t}$ of the frequency offsets using a frequency offset estimator 311 from preambles of an uplink frame at a carrier frequency fc, received from the subscriber stations SS1, SS2 and SSM. The base station 310 compensates for the average frequency offset from the uplink frame, which has a small frequency offset shift because the transmitters 620, 630 and 640 of the subscriber stations SS1, SS2 and SSM previously compensate for the frequency offsets of the subscriber stations. Accordingly, the frequency offset of each subscriber station can be correctly compensated in the uplink communication.

The frequency offset compensation principle is as follows.

In general, a communications signal is represented by a complex signal s in a Cartesian coordinate form, as shown in Equation 1. The complex signal s includes a real part x and an imaginary part y.

$$s = x + jy \qquad \text{[Equation 1]}$$

The complex signal s can be also represented in a polar coordinate form as follows.

$$s = M \cdot e^{j\Phi} \qquad \text{[Equation 2]}$$

The Cartesian coordinate and the polar coordinate have the following relationship between them.

$$X = Re[X] + jIm[X] = X_r + jX_i = \sqrt{X_r^2 + X_i^2} \cdot e^{j\,tan^{-1}(X_i/X_r)} = A_X \cdot e^{j\Phi_X}$$

$$s = x + jy = \sqrt{x^2 + y^2} e^{j\,tan^{-1}(y/x)} = A \cdot e^{j\Phi} \qquad \text{[Equation 3]}$$

When the complex signal s has a frequency offset Δf, the following result is obtained.

$$r = s \cdot e^{j2\pi\Delta ft} \qquad \text{[Equation 4]}$$

That is, a reception signal r is received such that the phase of the complex signal s is rotated according to the frequency offset Δf and a time variable t.

In Equation 4, $e^{j2\pi\Delta ft}$ is represented as follows.

$$e^{j2\pi\Delta ft} = \cos(2\pi\Delta ft) + i\sin(2\pi\Delta ft) \qquad \text{[Equation 5]}$$

A receiver estimates the frequency offset Δf and reversely rotates the phase of the reception signal, which has been rotated by the frequency offset. This is frequency offset compensation. On the basis of this principle, a method of compensating for a frequency offset of a signal in a Cartesian coordinate form reversely rotates the reception signal r by $e^{-j2\pi\Delta ft}$ to obtain the communications signal s.

$$s = r \cdot e^{-j2\pi\Delta ft} \qquad \text{[Equation 6]}$$

When Equation 6 is replaced with Equation 5, the following equation is obtained.

$$s = r \cdot e^{-j2\pi\Delta ft} = (x' + jy')[\cos(-2\pi\Delta ft) + i\sin(-2\pi\Delta ft)] \qquad \text{[Equation 7]}$$

Here, assume that the reception signal r includes a real part x' and an imaginary part y'. Equation 7 is arranged as follows.

$$s = [x'\cos(-2\pi\Delta ft) - y'\sin(-2\pi\Delta ft)] + j[y'\cos(-2\pi\Delta ft) + x'\sin(-2\pi\Delta ft)] \qquad \text{[Equation 8]}$$

Therefore, the frequency offset Δf of the reception signal r is compensated to obtain the original complex signal s.

Figure 7:
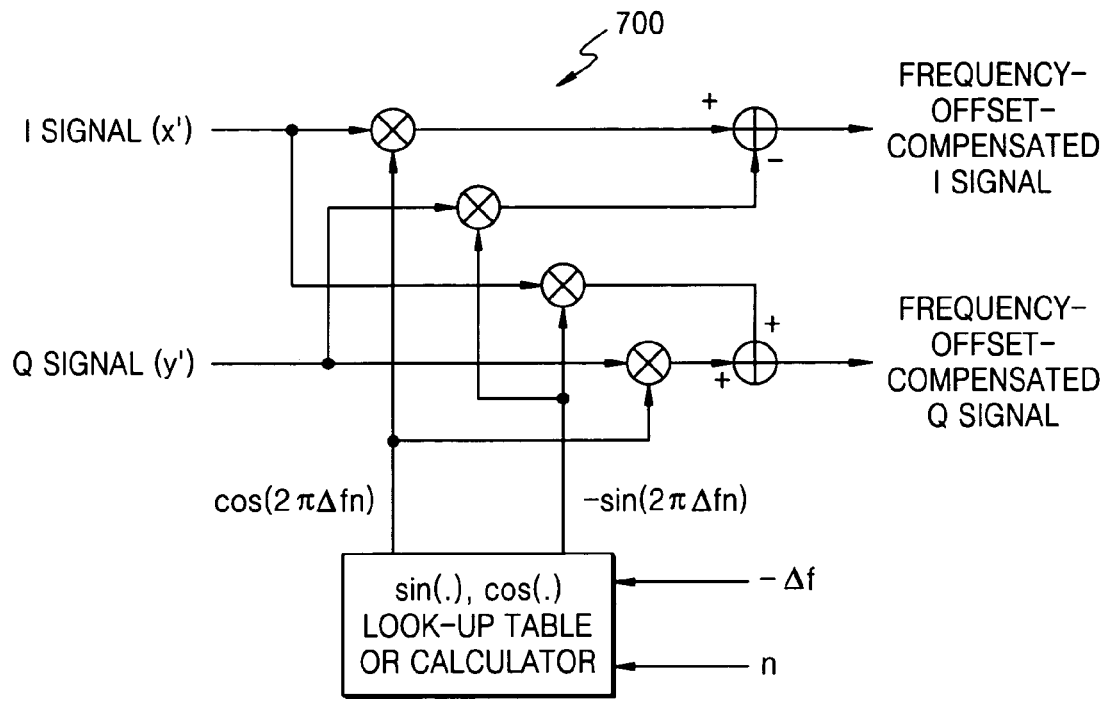
FIG. 7 illustrates a frequency offset compensator used for the OFDMA system of FIG. 6 according to an embodiment of the present disclosure.

As shown in FIG. 7, a frequency offset compensator for realizing Equation 8 is indicated generally by the reference numeral 700.

In the meantime, frequency offset compensation of the signal in a polar coordinate form represented by Equation 2 is as follows.

$$s = r \cdot e^{-j2\pi\Delta ft} = M' \cdot e^{j\Phi'} \cdot e^{-j2\pi\Delta ft} = M' \cdot e^{j(\Phi' - 2\pi\Delta ft)} \qquad \text{[Equation 9]}$$

Accordingly, the complex signal s is obtained by subtracting only a phase term from the reception signal r.

Figure 8:
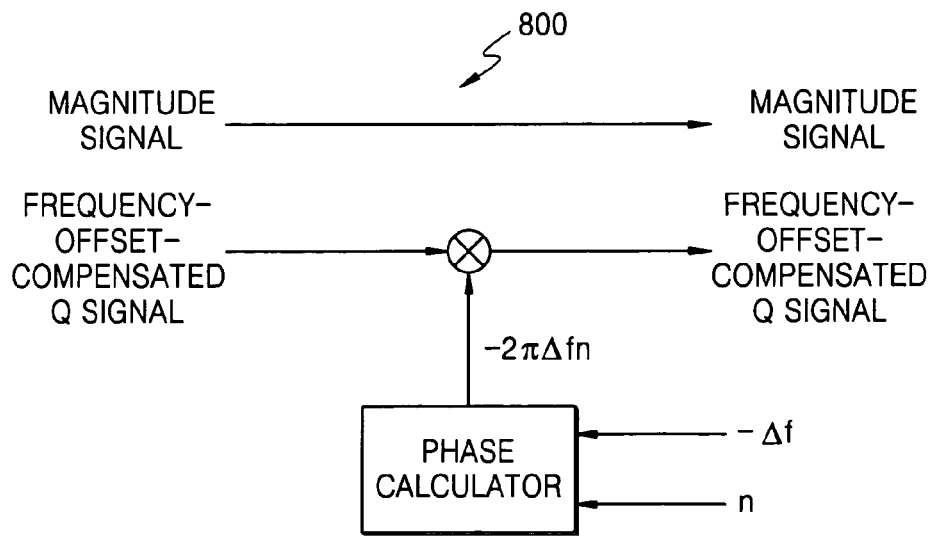
FIG. 8 illustrates a frequency offset compensator used for the OFDMA system of FIG. 6 according to another embodiment of the present disclosure.

Turning to FIG. 8, a frequency offset compensator for realizing Equation 9 is indicated generally by the reference numeral 800.

FIG. 9 illustrates the results of reproduction of an uplink frame by a base station when the uplink frame is transmitted from four subscriber stations SS1, SS2, SS3 and SS4 to the base station using the OFDMA system of the present disclosure, and indicated generally by the reference numeral 900. Referring to FIG. 9, when frequency offsets of the subscriber stations SS1, SS2, SS3 and SS4 are respectively set to 0, 0, 0 and 0.005 times a subcarrier interval, the subscriber stations SS1, SS2, SS3 and SS4 transmit the uplink frame in a BPSK signal form. Then, the base station reproduces received values with respect to the subscriber stations SS1, SS2, SS3 and SS4 into signal constellation of BPSK.

Figure 5:
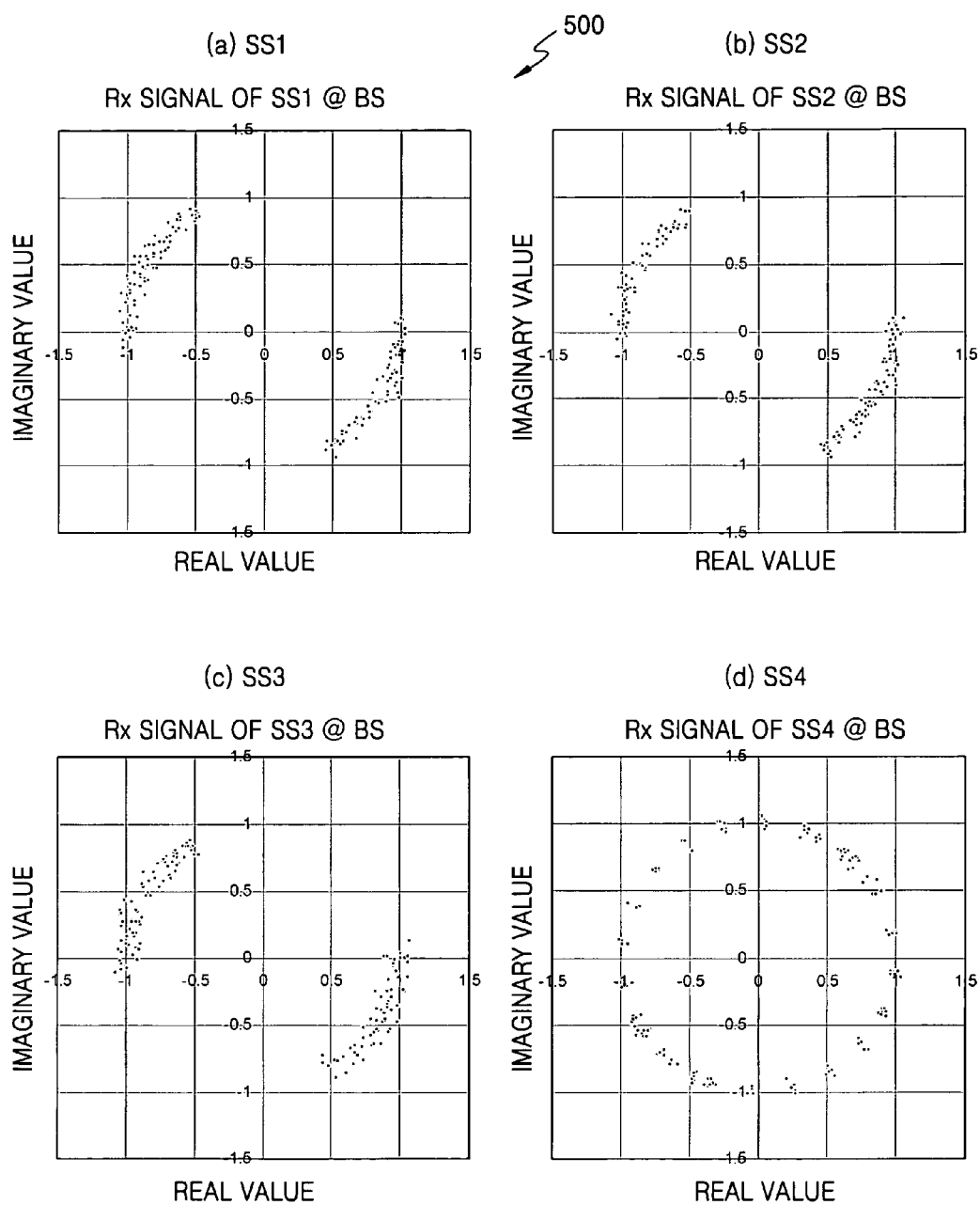
FIG. 5 illustrates constellations of signals transmitted from subscriber stations to a base station in the uplink communications environment of FIG. 4.
Figure 10A:
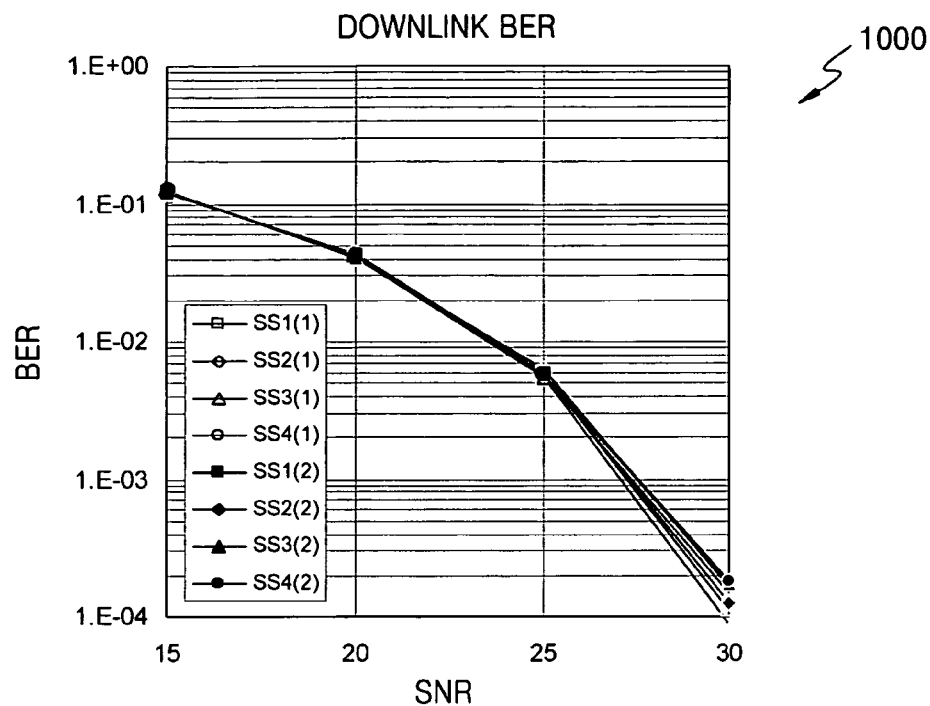
FIGS. 10a and 10b are graphs showing the relationship between SNR and BER in the conventional OFDMA system of FIG. 4 and the OFDMA system of FIG. 6.
Figure 10B:
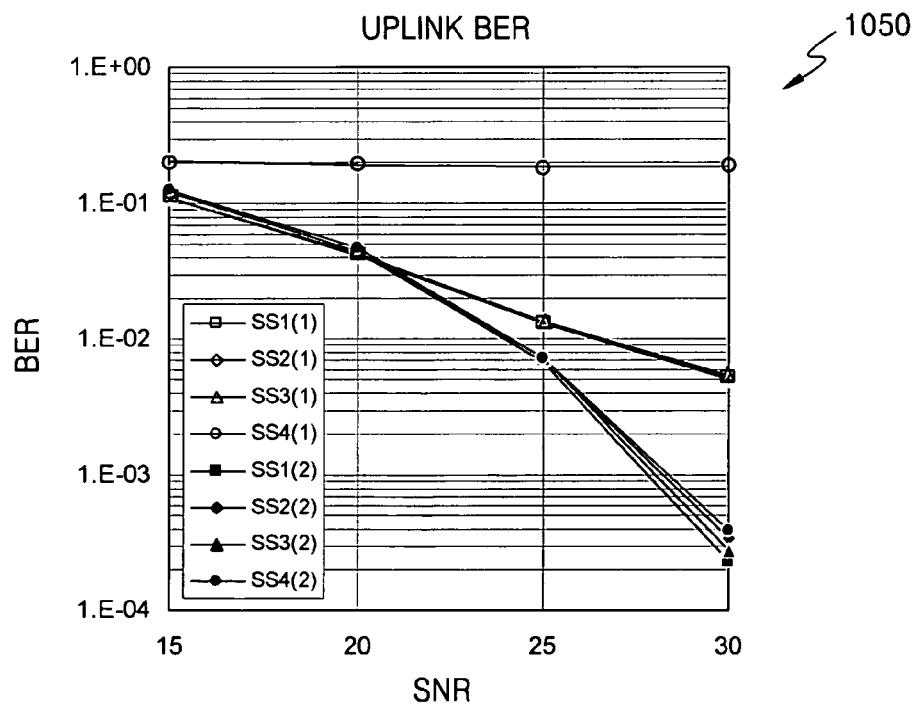

FIGS. 10*a* and 10*b* are graphs showing the relationship between SNR and BER of the OFDMA system according to the present disclosure, which are obtained by adding a noise environment to the condition of FIG. 5 and performing computer simulations.

FIG. 10*a* shows downlink performance and the result obtained, indicated generally by the reference numeral 1000, when each subscriber station receives a downlink frame, reproduces data allocated thereto and then detects a bit error. The numeral 1 in brackets shows performance of the conventional OFDMA system of FIG. 3 and the numeral 2 in brackets represents performance of the OFDMA system of the present disclosure, which show similar performances.

FIG. 10*b* shows uplink performance, indicated generally by the reference numeral 1050. Referring to FIG. 10*b*, the performance of a subscriber station SS4 is remarkably deteriorated and the performances of subscriber stations SS1, SS2 and SS3 are also deteriorated due to the effect of the frequency offset of the subscriber station SS4 in the conventional OFDMA system. However, the performances of the four subscriber stations are similar in case of the OFDMA system according to the present disclosure.

FIG. 11 is a flow chart showing a frequency offset compensating method in the OFDMA system of the present disclosure, and indicated generally by the reference numeral 1100. Referring to FIG. 11, in the case of a downlink, a base station generates a downlink frame including a frequency offset control signal in the step 1101, and transmits the downlink frame to each subscriber station in the step 1102. Each subscriber station detects the downlink frame in the steps 1111 and 1112, and estimates the frequency offset thereof from a preamble of the downlink frame to compensate for the frequency offset in the step 1113. Then, each subscriber station processes data included in the downlink frame, such as a header, DL_MAP, UP_MAP and burst data, in the step 1114.

In the case of an uplink, each subscriber station detects the frequency offset control signal and generates an uplink frame in the step 1115. When the frequency offset control signal is activated in the step 1116, each subscriber station compensates for a frequency offset of the uplink frame by the frequency offset of the subscriber station in the step 1117 and transmits the uplink frame to the base station in the step 1118. The base station detects the uplink frame in the steps 1103 and 1104 and estimates an intermediate frequency offset from preambles of the uplink frame to compensate for the intermediate frequency offset in the step 1105. Then, the base station processes the uplink frame in the step 1106.

While the present invention has been particularly shown and described with reference to exemplary embodiments thereof, it will be understood by those of ordinary skill in the pertinent art that various changes in form and details may be made therein without departing from the spirit and scope of the present invention as defined by the following claims.

What is claimed is:

1. An orthogonal frequency division multiple access (OFDMA) system comprising:
    a base station; and
    a plurality of subscriber stations in signal communication with the base station, each subscriber station having a unique uplink frequency offset,
    wherein each subscriber station compensates for its own unique uplink frequency offset prior to transmitting compensated data to the base station, constructs an uplink frame comprising the compensated data, and transmits the uplink frame to the base station as a substantially real-valued signal,
    wherein the base station receives uplink frames from the plurality of subscriber stations, each uplink frame comprising data compensated for the unique uplink frequency offset of the transmitting subscriber station, respectively, compensates for the uplink frame by an intermediate frequency offset obtained by averaging the unique uplink frequency offsets of the uplink frames transmitted from the subscriber stations, respectively, and
    wherein each subscriber station compensates for its own unique uplink frequency offset relative to the intermediate frequency offset by compensating the phase of its uplink signal prior to transmitting the uplink frame to the base station.

2. The OFDMA system as claimed in claim 1, wherein the subscriber stations compensate for their frequency offsets on the uplink frame in response to a frequency offset control signal included in a downlink frame transmitted from the base station.

3. The OFDMA system as claimed in claim 1, wherein the subscriber stations compensates for the downlink frame transmitted from the base station by their frequency offsets.

4. The OFDMA system as claimed in claim 3, wherein the subscriber stations compensate for the uplink frame by the frequency offsets compensated on the down link frame.

5. A frequency offset control method of an orthogonal frequency division multiple access (OFDMA) system having a base station and a plurality of subscriber stations in signal communication with the base station, each subscriber station having a unique uplink frequency offset, the method comprising:
    the base station providing a frequency offset control signal comprising a unique uplink frequency offset for each subscriber station, respectively;
    each subscriber station selectively compensating for its own unique uplink frequency offset prior to transmitting compensated data to the base station, constructing an uplink frame comprising the compensated data, and transmitting the uplink frame to the base station as a substantially real-valued signal; and
    the base station receiving uplink frames from the plurality of subscriber stations, each uplink frame comprising data compensated for the unique uplink frequency offset of the transmitting subscriber station, respectively, compensating for the uplink frame by an intermediate frequency offset obtained by averaging the unique uplink frequency offsets of the uplink frames transmitted from the subscriber stations, respectively,
    wherein each subscriber station compensates for its own unique uplink frequency offset relative to the intermediate frequency offset by compensating the phase of its uplink signal prior to transmitting the uplink frame to the base station.

6. The frequency offset control method as claimed in claim 5, wherein the frequency offset control signal is included in a downlink frame transmitted from the base station to the subscriber stations.

7. The frequency offset control method as claimed in claim 5, further comprising:
    the base station detecting the uplink frame; and
    estimating an intermediate frequency offset obtained by averaging frequency offsets from preambles of the uplink frame and compensating for the intermediate frequency offset.

8. A frequency offset control method of an orthogonal frequency division multiple access (OFDMA) system, comprising:
    a base station generating a downlink frame including a frequency offset control signal and transmitting the downlink frame to each subscriber station;
    each subscriber station detecting the downlink frame, estimating a frequency offset thereof and compensating for the frequency offset;
    each subscriber station detecting the frequency offset control signal and generating an uplink frame;
    each subscriber station selectively compensating for its own unique uplink frequency offset prior to transmitting compensated data to the base station, constructing an uplink frame comprising the compensated data, and transmitting the uplink frame to the base station in response to the frequency offset control signal as a substantially real-valued signal; and
    the base station receiving uplink frames from the plurality of subscriber stations, each uplink frame comprising data compensated for the unique uplink frequency offset of the transmitting subscriber station, respectively, compensating for the uplink frame by an intermediate frequency offset obtained by averaging the unique uplink frequency offsets of the uplink frames transmitted from the subscriber stations, respectively,
    wherein each subscriber station compensates for its own unique uplink frequency offset relative to the intermediate frequency offset by compensating the phase of its uplink signal.

9. The frequency offset control method as claimed in claim 8, further comprising:
    the base station detecting the uplink frame; and
    estimating an intermediate frequency offset obtained by averaging frequency offsets from preambles of the uplink frame to compensate for the intermediate frequency offset.

10. An orthogonal frequency division multiple access (OFDMA) system comprising:
    a base station; and
    a plurality of subscriber stations in signal communication with the base station, each subscriber station having a unique uplink frequency offset,
    wherein each subscriber station compensates for its own unique uplink frequency offset relative to the intermediate frequency offset by compensating the phase of its uplink signal prior to transmitting the uplink frame to the base station, a plurality of subscriber stations, each of the plurality of subscriber stations comprising frequency compensation means for compensating its own unique uplink frequency offset prior to transmitting compensated data to the base station, frame construction means for constructing an uplink frame comprising the compensated data, and frame transmission means for transmitting the uplink frame to a base station as a substantially real-valued signal; and the base station comprising frame reception means for receiving uplink frames from the plurality of subscriber stations as substantially real-valued signals, each uplink frame comprising data compensated for the unique uplink frequency offset of the transmitting subscriber station, respectively, and frequency offset means for compensating the uplink frame by an intermediate frequency offset obtained by averaging the unique uplink frequency offsets of the uplink frames transmitted from the subscriber stations, respectively, wherein each subscriber station compensates for its own unique uplink frequency offset relative to the intermediate frequency offset by compensating the phase of its uplink signal.

11. An OFDMA system as defined in claim 10 wherein the intermediate frequency offset is obtained by averaging frequency offsets of the uplink frame transmitted from the subscriber stations.

12. An OFDMA system as defined in claim 10 wherein the subscriber stations compensate for their frequency offsets on the uplink frame in response to a frequency offset control signal included in a downlink frame transmitted from the base station.

13. An OFDMA system as defined in claim 12 wherein the offset control signal is responsive to a frequency offset control method comprising:

selectively compensating for frequency offsets of an uplink frame, respectively generated by a plurality of subscriber stations, in response to a frequency offset control signal provided by a base station; and each subscriber station transmitting the uplink frame to the base station.

14. An OFDMA system as defined in claim 13 wherein the frequency offset control signal is included in a downlink frame transmitted from the base station to the subscriber stations.

15. An OFDMA system as defined in claim 13, the frequency offset control method further comprising:

detecting the uplink frame at the base station; and estimating an intermediate frequency offset obtained by averaging frequency offsets from preambles of the uplink frame; and compensating for the intermediate frequency offset.

16. An OFDMA system as defined in claim 12 wherein the offset control signal is responsive to a frequency offset control method comprising:

generating a downlink frame including a frequency offset control signal and transmitting the downlink frame to each subscriber station;

detecting the downlink frame, estimating a frequency offset thereof and compensating for the frequency offset;

detecting the frequency offset control signal and generating an uplink frame; and compensating a frequency offset of the uplink frame in response to the frequency offset control signal.

17. An OFDMA system as defined in claim 16 wherein:

generating the downlink frame is performed at the base station;

detecting the downlink frame is performed at each subscriber station;

detecting the frequency offset control signal is performed at each subscriber station; and compensating a frequency offset of the uplink frame is performed at each subscriber station.

18. An OFDMA system as defined in claim 16, the frequency offset control method further comprising:

detecting the uplink frame at the base station; and estimating an intermediate frequency offset obtained by averaging frequency offsets from preambles of the uplink frame to compensate for the intermediate frequency offset.

19. An OFDMA system as defined in claim 10 wherein the subscriber stations compensates for the downlink frame transmitted from the base station by their frequency offsets.

20. An OFDMA system as defined in claim 19 wherein the subscriber stations compensate for the uplink frame by the frequency offsets compensated on the downlink frame.

* * * * *